(12) United States Patent  
Kim et al.

(10) Patent No.: US 10,352,192 B2
(45) Date of Patent: Jul. 16, 2019

(54) GAS TURBINE

(71) Applicant: DOOSAN HEAVY INDUSTRIES & CONSTRUCTION CO., LTD., Changwon-si, Gyeongsangnam-do (KR)

(72) Inventors: Yeong Chun Kim, Changwon-si (KR); Jeong Min Kim, Changwon-si (KR)

(73) Assignee: Doosan Heavy Industries Contruction Co., Ltd, Gyeongsangnam-do (KR)

(*) Notice: Subject to any disclaimer, the term of this patent is extended or adjusted under 35 U.S.C. 154(b) by 29 days.

(21) Appl. No.: 15/783,227

(22) Filed: Oct. 13, 2017

(65) Prior Publication Data

US 2018/0106164 A1    Apr. 19, 2018

(30) Foreign Application Priority Data

Oct. 13, 2016 (KR) .................. 10-2016-0132618

(51) Int. Cl.
*F01D 25/16* (2006.01)
*F01D 25/24* (2006.01)
(Continued)

(52) U.S. Cl.
CPC ........... *F01D 25/16* (2013.01); *F01D 25/162* (2013.01); *F01D 25/24* (2013.01); *F01D 25/28* (2013.01);
(Continued)

(58) Field of Classification Search
CPC ........ F01D 25/16; F01D 25/24; F01D 25/162; F01D 25/285; F01D 25/28; F02C 7/06; F02C 7/20; F02C 7/04; F05D 2240/52; F05D 2230/72; F05D 2220/32; F05D 2240/90; F05D 2230/70; F05D 2230/60
See application file for complete search history.

(56) References Cited

U.S. PATENT DOCUMENTS

2010/0037855 A1* 2/2010 French .................. F01D 25/16
123/323
2013/0192256 A1* 8/2013 Suciu ..................... F02K 3/06
60/796
(Continued)

FOREIGN PATENT DOCUMENTS

EP    2806113 A1    11/2014
FR    3005098 A1    10/2014
(Continued)

OTHER PUBLICATIONS

Office Action dated Oct. 18, 2017 in Korean Application No. 10-2016-0132618.
(Continued)

*Primary Examiner* — Sizo B Vilakazi
(74) *Attorney, Agent, or Firm* — Invenstone Patent, LLC

(57) ABSTRACT

A gas turbine comprises a strut assembly including an inner ring; an inclined member including a first end connected to the inner ring, a second end positioned opposite the first end, and a flange extending radially inward from the second end; an oil sump mounted to the second end or the flange; a thrust bearing fixed to the oil sump; and a thrust collar extending radially from a rotor, wherein the inclined member has an aperture portion formed therein, the aperture portion is positioned in an upper portion of a region between the thrust bearing and a journal bearing, and the aperture portion has a width and a circumferential length greater than at least the journal bearing. The gas turbine has the feature that the journal bearing is easily withdrawn and the total weight of the gas turbine is reduced.

14 Claims, 4 Drawing Sheets

(51) Int. Cl.
*F01D 25/28* (2006.01)
*F02C 7/06* (2006.01)
*F02C 7/20* (2006.01)
*F02C 7/04* (2006.01)

(52) U.S. Cl.
CPC .............. *F01D 25/285* (2013.01); *F02C 7/04* (2013.01); *F02C 7/06* (2013.01); *F02C 7/20* (2013.01); *F05D 2220/32* (2013.01); *F05D 2230/60* (2013.01); *F05D 2230/70* (2013.01); *F05D 2230/72* (2013.01); *F05D 2240/52* (2013.01); *F05D 2240/90* (2013.01)

(56) References Cited

U.S. PATENT DOCUMENTS

| | | |
|---|---|---|
| 2015/0026979 A1 | 1/2015 | Muller |
| 2016/0195016 A1* | 7/2016 | Andersson .............. F01D 25/16 415/213.1 |
| 2016/0348591 A1* | 12/2016 | Suciu ...................... F01D 9/042 |
| 2017/0138218 A1* | 5/2017 | Waki ........................ B66C 1/10 |

FOREIGN PATENT DOCUMENTS

| | | |
|---|---|---|
| GB | 1040525 A | 8/1966 |
| JP | 09-060532 A | 3/1997 |
| JP | 2000-213542 A | 8/2000 |
| JP | 2005-240691 A | 9/2005 |
| KR | 10-2015-0119440 A | 10/2015 |
| WO | WO 2015/198858 A1 | 12/2015 |
| WO | WO-2016/078926 A1 | 5/2016 |

OTHER PUBLICATIONS

International Search Report dated Jan. 31, 2018 in International Application No. PCT/KR2017/011237.

European Search Report in dated Mar. 8, 2018 European Application No. 17196191.5.

* cited by examiner

GAS TURBINE

CROSS-REFERENCE(S) TO RELATED APPLICATIONS

This application claims priority to Korean Patent Application No. 10-2016-0132618, filed on Oct. 13, 2016, the disclosure of which is incorporated herein by reference in its entirety.

BACKGROUND OF THE INVENTION

Field of the Invention

Exemplary embodiments of the present invention relate to a gas turbine structure that enables a journal bearing to be withdrawn without disassembling a support strut, and more particularly, to an aperture that is formed adjacent to a strut, and a cover that covers the aperture.

Description of the Related Art

A gas turbine is a motor that obtains torque by driving a blade wheel with high-temperature and high-pressure combustion gas. The gas turbine produces high-temperature and high-pressure gas by compressing air by a compressor, heating the air at high temperature through a preheater, and then combusting the air in a combustion chamber together with fuel injected thereinto, so as to generate power by rotating blades of the turbine with thermal energy of the produced gas. In this case, the rotational speed of a rotor is thousands of revolutions per minute.

As illustrated in FIG. 1, a gas turbine is divided into an intake section 100, a compressor section 200, a combustor section 300, and a turbine section 400. The gas turbine includes a rotor that rotates in a horizontally laid state, and a journal bearing that supports a load in the direction of gravity. The journal bearing is mainly installed inside an inner ring of a radial support strut to be suitable for the inner circumference of the inner ring. The journal bearing typically comprises two journal bearings, one of which is positioned at a compressor and the other of which is positioned opposite the compressor. The journal bearing serves to support a load of a rotary shaft and a load during high-speed rotation and to help the gas turbine to smoothly rotate.

Maintenance of the journal bearing is performed when the gas turbine is stopped. Referring to FIG. 2, there is used a method of withdrawing a journal bearing 2 by disposing a jig 3 beneath an inclined member 21 and fastening the journal bearing 2 to a wire 4 after a sump 22 is removed, in a conventional gas turbine. In this method, the jig 3 has to be disposed beneath the inclined member 21, a portion of the journal bearing 2 has to be suspended therebeneath, and the journal bearing 2 has to move in a left-upward direction. Hence, a thrust bearing 1 or a thrust collar 12 is positioned farther than the end of the inclined member 21 from a strut 20, as illustrated in FIG. 2. The reason is that there is a need to provide a path in which the journal bearing 2 is pulled out by the jig 3.

Meanwhile, the sump 22 serves to store and supply oil required for the thrust bearing 1, the journal bearing 2, and the like. When the thrust bearing 1 is positioned away from the journal bearing 2 as described above, the sump 22 necessarily moves away from the journal bearing 2, and a rotor end 11 is positioned outside the sump 22 so that the length of a rotor 10 is long.

Meanwhile, a whirling speed is low as the distance between the rotor end 11 and the journal bearing 2 is long. Accordingly, it is necessary to secure the above-mentioned path in which the journal bearing 2 is pulled out by the jig 3 in the conventional gas turbine. For this reason, the conventional gas turbine is problematic in that the thrust bearing 1 and the thrust collar 12 have to secure a certain distance from the journal bearing 2 and this structure causes the whirling speed to be low.

[Related Art Document]
[Patent Document]
(Patent Document) U.S. Patent Application Publication No. 2015-0026979 A1

SUMMARY OF THE INVENTION

The present invention provides a gas turbine that includes an aperture formed therein for withdrawal of a journal bearing in the vicinity of a strut, and a cover for covering the aperture, thereby designing a length of a rotor itself to be shorter than in the related art by reducing the distance between a rotor end and the journal bearing.

Other aspects of the present invention can be understood by the following description, and become apparent with reference to the embodiments of the present invention. Also, it is obvious to those skilled in the art to which the present invention pertains that the benefits of the present invention can be realized by the means as claimed and combinations thereof.

In accordance with one aspect of the present invention, a gas turbine comprises a strut assembly including an inner ring; an inclined member including a first end connected to the inner ring, a second end positioned opposite to the first end, and a flange extending radially inward from the second end; an oil sump mounted to the second end or the flange; a thrust bearing fixed to the oil sump; and a thrust collar extending radially from a rotor and coupled to the thrust bearing, wherein the inclined member has an aperture portion formed therein, the aperture portion is positioned in an upper portion of a region between the thrust bearing and a journal bearing, and the aperture portion has a width and a circumferential length greater than at least the journal bearing.

In this aspect of the present invention, a casing of an intake section of the gas turbine is configured such that the inclined member adjacent to the strut assembly has an aperture formed to be openable and closable with a cover, thereby providing a foundation that enables the thrust bearing, the thrust collar, and a coupling of a rotor end to be designed closest to the strut assembly.

The gas turbine may further comprise a cover detachably attached to the aperture portion. The aperture portion is opened when the journal bearing is withdrawn or the inner portion of the gas turbine is undergoing maintenance. In this case, it is possible to lift the journal bearing in a vertical direction using a jig in a state in which the detachable cover is opened. Accordingly, the width and circumferential length of the aperture portion is preferably greater than at least those of the journal bearing as described above.

In a modified example of the present invention, one portion of the detachable cover is rotatably coupled to the inclined member. Thus, it is possible to reduce the process of moving the cover to a separate place even in the state in which the cover is opened. A hinge may be installed at a point in which one portion of the cover meets the inclined member.

The strut assembly may be directed to the inclined member and have a boundary surface perpendicular to a rotary shaft of the rotor. The aperture portion may include a first edge at a side of the first end of the inclined member, and a second edge at a side of the second end of the inclined member. Preferably, the distance between the second edge and the boundary surface is short. In detail, the distance between the second edge and the boundary surface may be 2 times or less, and preferably 1.5 times or less, the distance between the first edge and the boundary surface. More preferably, the distance between the second edge and the boundary surface may be equal to the distance between the first edge and the boundary surface.

Ultimately, this distance-related structure is to reduce the total length of the rotor as a rotary body. In addition to the structure, the distance between the thrust bearing and the boundary surface is preferably short to be close to the distance between the second edge and the boundary surface. In detail, the distance between the thrust bearing and the boundary surface has to be equal to at least the distance between the second edge and the boundary surface. Preferably, the distance between the thrust bearing and the boundary surface may be equal to the distance between the second edge and the boundary surface.

According to the above structure, it is possible to reduce the distance from the journal bearing (or the boundary surface of the strut assembly) to the coupling of the rotor end to about a third, and to secure a margin that enables the whirling speed of rotation of the coupling to be adjusted to a desired level.

In accordance with another aspect of the present invention, an air intake casing for a gas turbine comprises a strut assembly including an inner ring, and an inclined member connected to the inner ring, wherein the inclined member includes a withdrawal part having an aperture formed therein. The air intake casing may further comprise a cover detachably attached to the withdrawal part.

In accordance with a further aspect of the present invention, a gas turbine comprises a support strut positioned in a compressor section, a thrust bearing positioned in an intake section, and an inclined member positioned between the support strut and the thrust bearing, wherein the inclined member has a conical shape that a diameter of the inclined member is reduced from the intake section to the compressor section, and the inclined member includes a withdrawal part connected to an inner ring of the support strut and having an aperture formed therein, and a cover configured to cover the aperture. The cover may have a sealing member, such as rubber, formed on the circumference thereof so as to inhibit air flowing along the conical inclined member from leaking into the inclined member.

The cover may comprise a first cover plate and a second cover plate.

The withdrawal part may be provided with a stepped portion protruding inward from a circumference of the aperture thereof, and one of the first and second cover plates may be formed so as to correspond to a small space of the stepped portion while the other thereof is formed so as to correspond to a large space of the stepped portion.

The first cover plate is smaller or larger than the second cover plate.

The larger one of the first and second cover plates may have a bonding surface formed in a circumferential direction thereof, and the bonding surface may be formed with a plurality of screw-coupling holes, so that the bonding surface is coupled to a portion of the stepped portion in a state in which they are in contact with each other.

It is to be understood that both the foregoing general description and the following detailed description of the present invention are exemplary and explanatory and are intended to provide further explanation of the invention as claimed.

BRIEF DESCRIPTION OF THE DRAWINGS

The above and other features of the present invention will be more clearly understood from the following detailed description taken in conjunction with the accompanying drawings, in which.

DESCRIPTION OF SPECIFIC EMBODIMENTS

Figure 1:
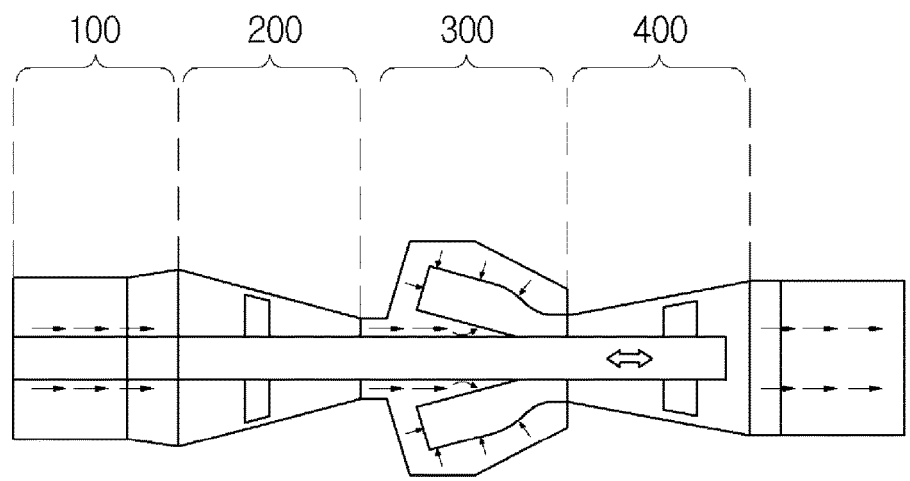
FIG. 1 is a view schematically illustrating sections of a typical gas turbine.
Figure 2:
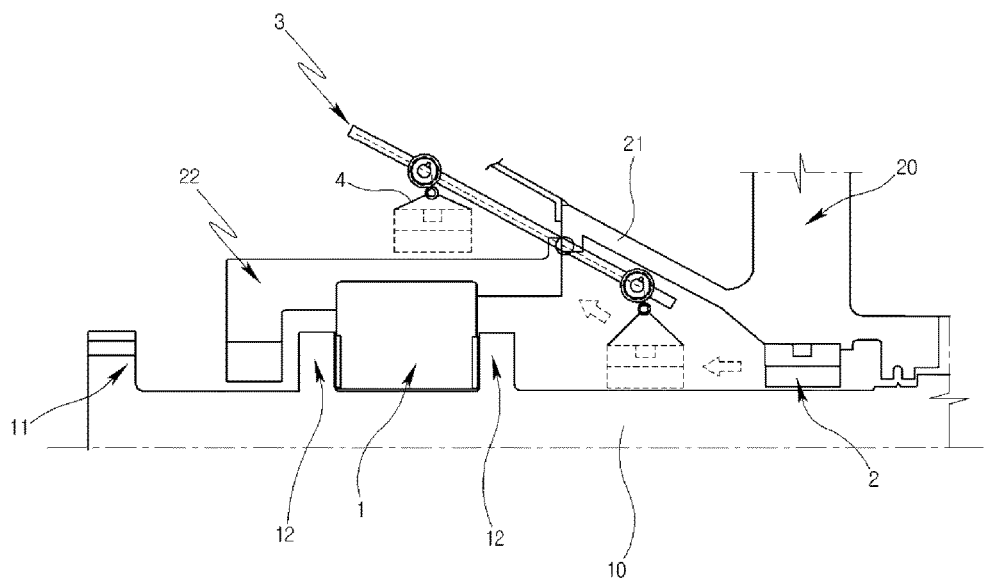
FIG. 2 is a cross-sectional view illustrating a structure in which a journal bearing is withdrawn by a jig in an intake section of a conventional gas turbine.

Reference will now be made in detail to the embodiments of the present invention, examples of which are illustrated in the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention. Hereinafter, a gas turbine according to exemplary embodiments of the present invention will be described in detail with reference to the accompanying drawings.

Figure 3:
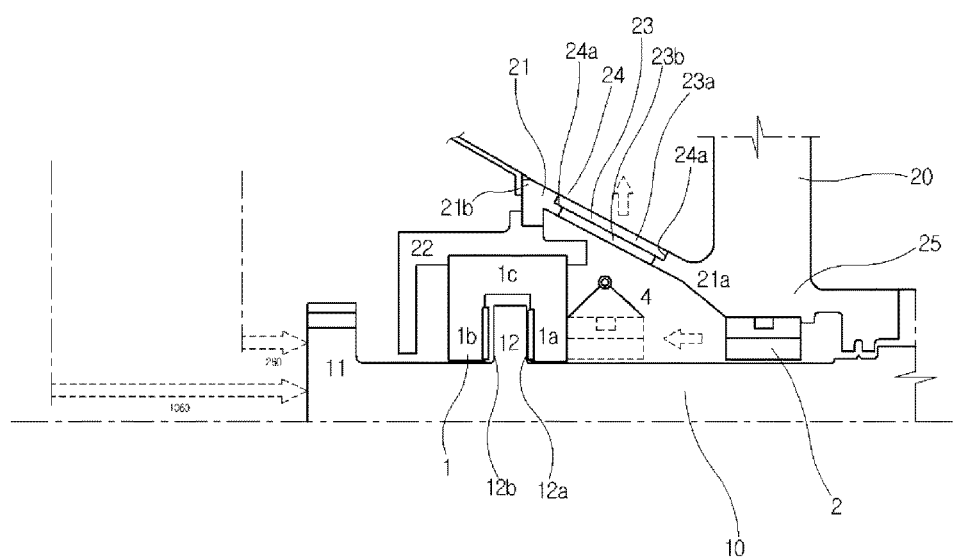
FIG. 3 is a cross-sectional view illustrating an upper half portion of an intake section of a gas turbine according to an embodiment of the present invention.

FIG. 3 is a cross-sectional view illustrating an upper half portion of an intake section of a gas turbine according to an embodiment of the present invention. The gas turbine basically includes a rotor 10, a strut assembly 20, and a journal bearing 2 installed between the rotor 10 and the strut assembly 20. The strut assembly 20 includes a truncated cone-shaped inclined member 21 formed in the front thereof so that air for combustion flows into a compressor by passing through a strut along the outer wall of the inclined member.

The inclined member 21 includes a withdrawal part 24 having an aperture formed in the upper portion thereof. Preferably, the withdrawal part 24 includes a stepped portion 24a. A cover 23 is placed above the stepped portion 24a. Preferably, the cover 23 covers and seals the withdrawal part 24 so as to inhibit leakage of air flowing along the outer wall of the inclined member 21.

Preferably, the stepped portion 24a has a coupling portion that is coupled with the cover 23 to inhibit vibration thereof. Similarly, a coupling portion such as a screw hole is preferably provided in a contact portion between the cover 23 and the stepped portion 24a.

The stepped portion 24a may be formed such that steps are seen when viewed from the top.

Specifically, the cover 23 includes a first cover plate 23a and a second cover plate 23b. The first cover plate 23a is formed above the second cover plate 23b, and is larger than the second cover plate 23b. Therefore, the first cover plate 23a may have a bonding surface 23c formed on a portion thereof in which the first cover plate 23a does not overlap the second cover plate 23b. The cover 23 may be coupled to the withdrawal part 24 using a fixing means such as screws in a state in which the bonding surface 23c is in contact with the stepped portion 24a.

Preferably, the aperture of the withdrawal part 24 has a greater width than at least the journal bearing 2. This is to lift and withdraw the journal bearing 2 in a vertical direction (in the direction of the arrow in FIG. 3) during maintenance by installing a jig and fastening the journal bearing 2 to a wire 4.

The wire 4 may be fastened to the journal bearing 2 using eye bolts.

The inclined member 21 includes a first end 21a, a second end 21b, and a flange 21c. The first end 21 is connected to a strut inner ring 25, and the second end 21b is provided with the flange 21c that extends radially inward. An oil sump 22 is mounted to the flange 21c.

A thrust bearing 1 is mounted to the oil sump 22. The journal bearing 2 supports a gravity load of the rotor 10, whereas the thrust bearing 1 is used to restrict the movement of a rotary shaft during the high-speed rotation of the rotor.

In this embodiment of the present invention, since the journal bearing 2 is withdrawable through the withdrawal part 24 as in FIG. 3, the thrust bearing 1 may be installed on the same line as the flange 21c. That is, the thrust bearing 1 may be installed close to the journal bearing 2 to the degree that it does not cover the withdrawal part 24 when viewed vertically from the bottom.

In the thrust bearing 1, a thrust collar 12 restricts the axial movement of the rotor 10. The thrust collar 12 extends radially outward from the rotor 10, and rotates in a state in which it is inserted into the internal space of the thrust bearing 1. First and second contact surfaces 12a and 12b of the thrust collar 12 come into contact with the inner portion of the thrust bearing 1 when they axially move during the high-speed rotation of the rotor 10.

The thrust bearing 1 includes a first support 1a, a second support 1b, and a connection 1c that extends between the first support 1a and the second support 1b. Thrust is restrained while the first and second contact surfaces 12a and 12b of the thrust collar 12 come into contact with the first and second supports 1a and 1b, respectively.

First and second boundary surfaces 20a and 20b of the strut assembly 20 are directed to the inclined member 21 and the compressor, respectively. The first and second boundary surfaces 20a and 20b are at a right angle to the rotary shaft. The withdrawal part 24 is preferably positioned closest to the first boundary surface 20a. This is because the thrust bearing 1 and the thrust collar 12 are designable to be positioned close to the first boundary surface 20a or the journal bearing 2 as the withdrawal part 24 is positioned close to the first boundary surface 20a. As such, when the thrust bearing 1 and the thrust collar 12 are installed closest to the strut assembly 20, the oil sump 22 and a rotor end 11 may be installed closer to the strut assembly 20 compared to in a conventional gas turbine, and thus the length of the rotor may be minimized.

Figure 4:
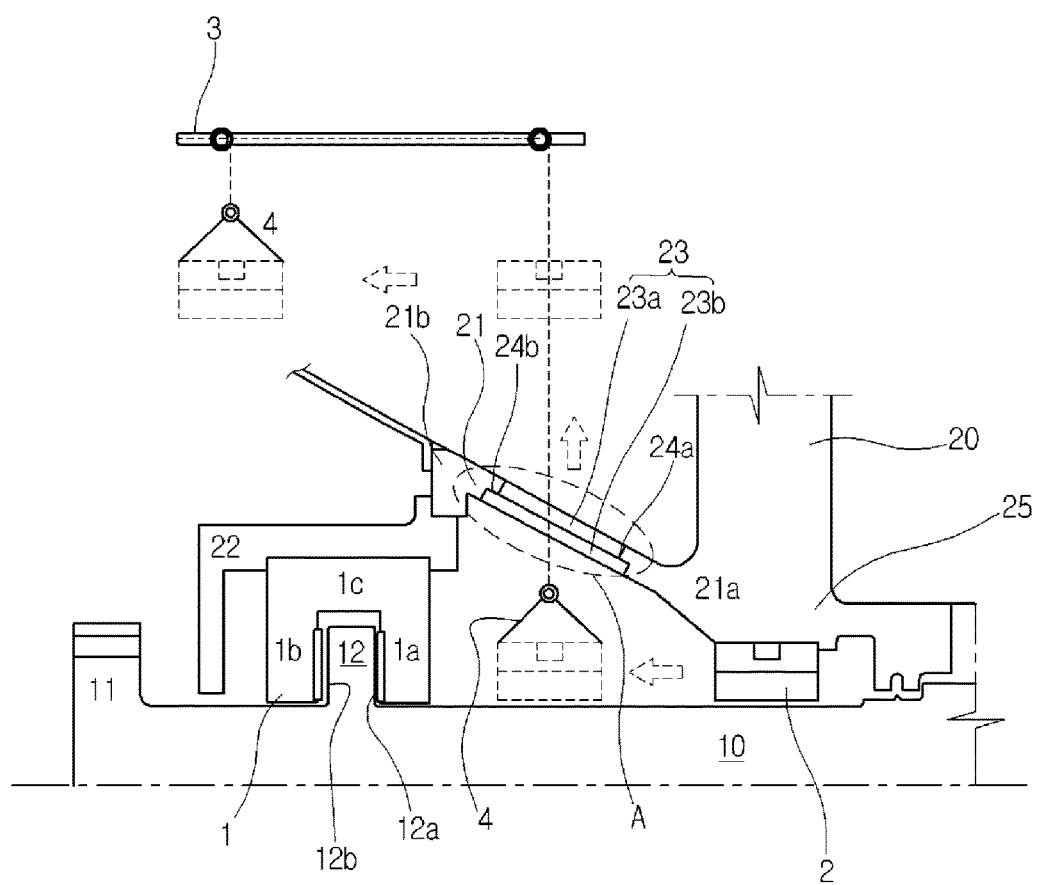
FIG. 4 is a cross-sectional view illustrating an upper half portion of an intake section of a gas turbine according to another embodiment of the present invention.

FIG. 4 is a cross-sectional view illustrating a method of withdrawing a journal bearing 2 using a jig 3 according to another embodiment of the present invention.

A thrust collar 12 and a thrust bearing 1 are positioned closest to an inclined member 21, as in the embodiment of FIG. 3. An oil sump 22 is detachably assembled to the thrust bearing 1 and a second end 21b of the inclined member 21. The oil sump 22 is easily accessible to a withdrawal part 24 since it is detachably formed.

A coupling is also positioned closest to the inclined member 21.

The inclined member 21 includes the withdrawal part 24 having an aperture formed in the upper portion thereof. Preferably, the withdrawal part 24 includes a stepped portion 24a. A cover 23 is placed beneath the stepped portion 24a. Preferably, the cover 23 covers and seals the withdrawal part 24 so as to inhibit leakage of air flowing along the outer wall of the inclined member 21.

Preferably, the stepped portion 24a has a coupling portion that is coupled with the cover 23 to inhibit vibration thereof. Similarly, a coupling portion such as a screw hole is preferably provided in a contact portion between the cover 23 and the stepped portion 24a.

The stepped portion 24a may be formed such that steps are not seen when viewed from the top.

Specifically, the cover 23 includes a first cover plate 23a and a second cover plate 23b. The first cover plate 23a is formed above the second cover plate 23b, and is smaller than the second cover plate 23b. Therefore, the second cover plate 23b may have a bonding surface 23c formed on a portion thereof in which the first cover plate 23a does not overlap the second cover plate 23b. The cover 23 may be coupled to the withdrawal part 24 using a fixing means such as screws in a state in which the bonding surface 23c is in contact with the stepped portion 24a.

Preferably, the aperture of the withdrawal part 24 has a greater width than at least the journal bearing 2. This is to permit one to lift and withdraw the journal bearing 2 in a vertical direction (in the direction of the arrow in FIG. 4) during maintenance by installing a jig 3 and fastening the journal bearing 2 to a wire 4. The method of withdrawing the journal bearing 2 by using the jig 3 is similar to that illustrated in FIG. 4.

The wire 4 may be fastened to the journal bearing 2 by using eye bolts.

The inclined member 21 includes a first end 21a, a second end 21b, and a flange 21c. The first end 21 is connected to a strut inner ring 25, and the second end 21b is provided with the flange 21c that extends radially inward. The oil sump 22 is mounted to the flange 21c.

The thrust bearing 1 is mounted to the oil sump 22. The journal bearing 2 supports a gravity load of the rotor 10, whereas the thrust bearing 1 is used to restrict the movement of a rotary shaft during the high-speed rotation of the rotor.

In this embodiment of the present invention, since the journal bearing 2 is withdrawable through the withdrawal part 24 as in FIG. 4, the thrust bearing 1 may be installed on the same line as the flange 21c. That is, the thrust bearing 1 may be installed close to the journal bearing 2 to the degree that it does not cover the withdrawal part 24 when viewed vertically from the bottom.

In the thrust bearing 1, the thrust collar 12 restricts the axial movement of the rotor 10. The thrust collar 12 extends radially outward from the rotor 10, and rotates in a state in which it is inserted into the internal space of the thrust bearing 1. First and second contact surfaces 12a and 12b of the thrust collar 12 come into contact with the inner portion of the thrust bearing 1 when they axially move during the high-speed rotation of the rotor 10.

The thrust bearing 1 includes a first support 1a, a second support 1b, and a connection 1c that extends between the first support 1a and the second support 1b. Thrust is restrained while the first and second contact surfaces 12a and 12b of the thrust collar 12 come into contact with the first and second supports 1a and 1b, respectively.

First and second boundary surfaces 20a and 20b of the strut assembly 20 are directed to the inclined member 21 and the compressor, respectively. The first and second boundary surfaces 20a and 20b are at a right angle to the rotary shaft. The withdrawal part 24 is preferably positioned closest to the first boundary surface 20a. This is because the thrust bearing 1 and the thrust collar 12 are designable to be positioned close to the first boundary surface 20a or the journal bearing 2 as the withdrawal part 24 is positioned close to the first boundary surface 20a. As such, when the thrust bearing 1 and the thrust collar 12 are installed closest to the strut assembly 20, the oil sump 22 and a rotor end 11 may be installed closer to the strut assembly 20 compared to in a conventional gas turbine, and thus the length of the rotor may be minimized.

Figure 5:
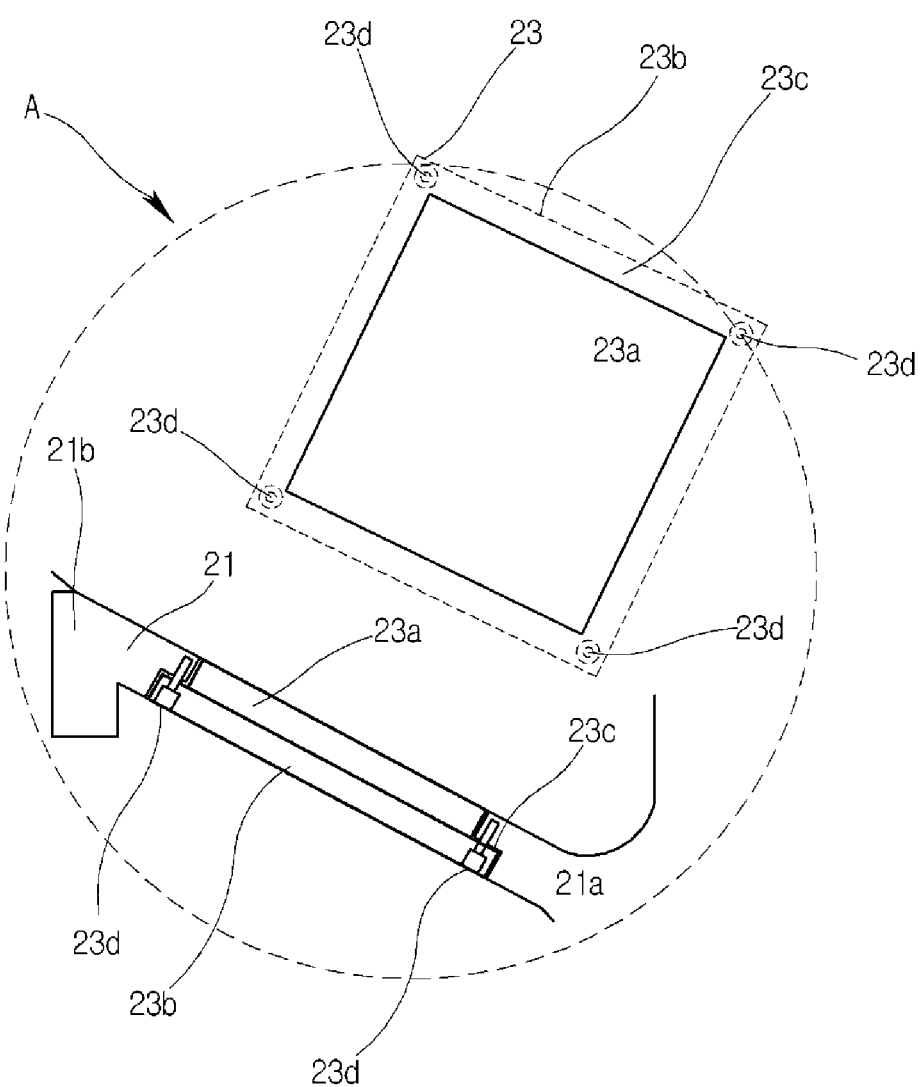
FIG. 5 is an enlarged view of portion "A" in FIG. 4 and a top view of a cover.

FIG. 5 is a view illustrating portion "A" in FIG. 4 in more detail. The bonding surface 23c is formed in the circumferential direction of the second cover plate 23b of the cover 23, screw-coupling holes 23d may be formed in four corners of the bonding surface 23c. The positions of the screw-coupling holes 23d may be modified, but the present invention is not limited thereto. In addition, when the first cover plate 23a is larger than the second cover plate 23b as in the embodiment illustrated in FIG. 3, screw-coupling holes 23d may be formed in the first cover plate 23a and screws may also be coupled to the screw-coupling holes 23d of the first cover plate 23a.

Although the cover 23 is illustrated to have a general square shape in FIG. 5, it may be modified in various manners according to the intake section form of the gas turbine. For example, the cover 23 may be curved in the circumferential direction of the intake section, or may be elongated in the width direction thereof As is apparent from the above description, a gas turbine according to exemplary embodiments of the present invention has advantages that a journal bearing is easily withdrawn during the maintenance of the gas turbine and the total weight of the gas turbine is reduced while increasing a whirling speed by virtue of a short length of a rotor.

While the present invention has been described with respect to the specific embodiments, it will be apparent to those skilled in the art that various changes and modifications may be made without departing from the spirit and scope of the invention as defined in the following claims.

What is claimed is:

1. A gas turbine comprising:
a strut assembly comprising an inner ring;
an inclined member comprising a first end connected to the inner ring, a second end positioned opposite to the first end, and a flange extending radially inward from the second end;
an oil sump mounted to the second end or the flange;
a thrust bearing fixed to the oil sump; and
a thrust collar extending radially from a rotor and coupled to the thrust bearing,
wherein the inclined member has an aperture portion formed therein, the aperture portion is positioned in an upper portion of a region between the thrust bearing and a journal bearing, and the aperture portion has a width and a circumferential length greater than at least the journal bearing.

2. The gas turbine according to claim 1, wherein the inclined member has a truncated cone shape.

3. The gas turbine according to claim 2, further comprising a cover detachably attached to the aperture portion.

4. The gas turbine according to claim 3, wherein:
the cover comprises a first cover plate and a second cover plate; and
the aperture portion is provided with a stepped portion protruding inward from a circumference of an aperture thereof, and one of the first and second cover plates is formed so as to correspond to a small space of the stepped portion while the other thereof is formed so as to correspond to a large space of the stepped portion.

5. The gas turbine according to claim 4, wherein the first cover plate is smaller than the second cover plate.

6. The gas turbine according to claim 5, wherein the second cover plate has a bonding surface formed in a circumferential direction thereof, and the bonding surface is formed with a plurality of screw-coupling holes, so that the bonding surface is coupled to a portion of the stepped portion in a state in which they are in contact with each other.

7. The gas turbine according to claim 6, wherein a hinge is formed at a point at which the cover meets the inclined member.

8. The gas turbine according to claim 7, wherein:
the strut assembly is directed to the inclined member and has a boundary surface perpendicular to a rotary shaft of the rotor; and
the aperture portion comprises a first edge at a side of the first end of the inclined member, and a second edge at a side of the second end of the inclined member.

9. The gas turbine according to claim 8, wherein a distance between the second edge and the boundary surface is smaller than or equal to a distance between the thrust bearing and the boundary surface.

10. The gas turbine according to claim 9, wherein the distance between the second edge and the boundary surface is equal to the distance between the thrust bearing and the boundary surface.

11. A gas turbine comprising:
a support strut positioned in a compressor section;
a thrust bearing positioned in an intake section; and
an inclined member positioned between the support strut and the thrust bearing,
wherein the inclined member has a conical shape that a diameter of the inclined member is reduced from the intake section to the compressor section, and the inclined member includes a withdrawal part connected to an inner ring of the support strut and having an aperture formed therein, and a cover configured to cover the aperture.

12. The gas turbine according to claim 11, wherein:
the cover comprises a first cover plate and a second cover plate; and
the withdrawal part is provided with a stepped portion protruding inward from a circumference of the aperture thereof, and one of the first and second cover plates is formed so as to correspond to a small space of the stepped portion while the other thereof is formed so as to correspond to a large space of the stepped portion.

13. The gas turbine according to claim 12, wherein the first cover plate is smaller than the second cover plate.

14. The gas turbine according to claim 13, wherein the second cover plate has a bonding surface formed in a circumferential direction thereof, and the bonding surface is formed with a plurality of screw-coupling holes, so that the bonding surface is coupled to a portion of the stepped portion in a state in which they are in contact with each other.

* * * * *